July 21, 1959 V. H. BRAY, JR 2,895,768
PNEUMATIC CONVEYING SYSTEM
Filed Sept. 9, 1957 2 Sheets-Sheet 1
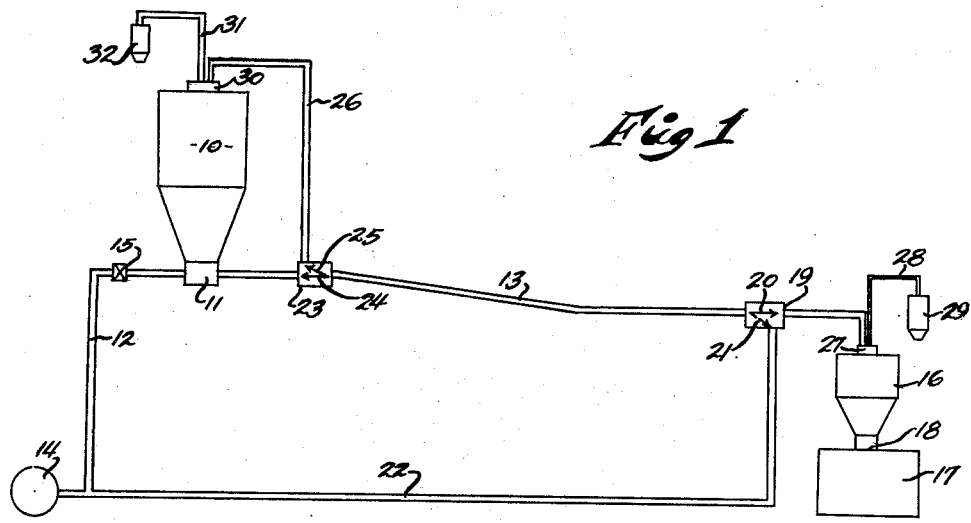
Fig 1
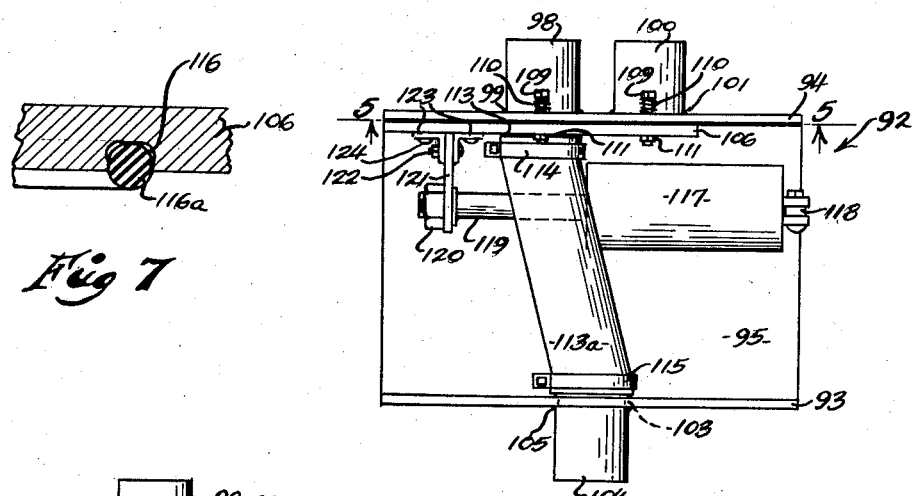
Fig 7
Fig 3
Fig 4
INVENTOR.
VERNON H BRAY JR.
BY
ATT'Y July 21, 1959
V. H. BRAY, JR
2,895,768
PNEUMATIC CONVEYING SYSTEM
Filed Sept. 9, 1957
2 Sheets-Sheet 2
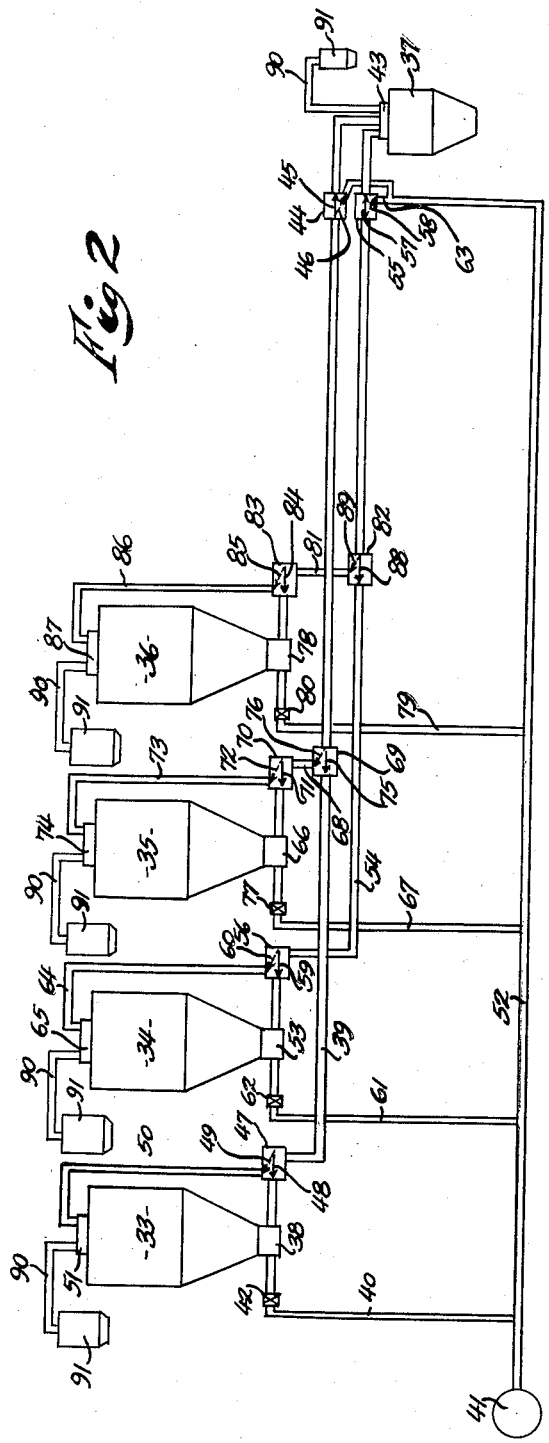
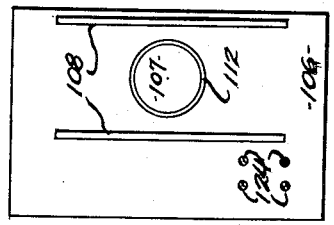
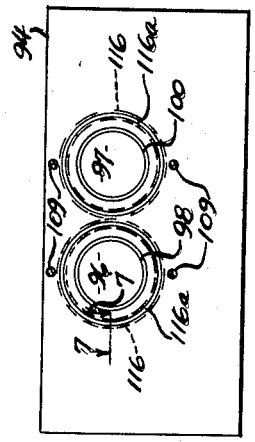
INVENTOR.
VERNON H BRAY JR.
BY
ATTY

United States Patent Office 2,895,768
Patented July 21, 1959

2,895,768

PNEUMATIC CONVEYING SYSTEM

Vernon H. Bray, Jr., Fullerton, Calif., assignor to National Food Equipment Co. Inc., Anaheim, Calif.

Application September 9, 1957, Serial No. 682,667

12 Claims. (Cl. 302—17)

The present invention relates to pneumatic conveying systems for bulk dry material such as flour, grain, sugar, salt, etc., and more specifically to a system of this type adapted for use in a bakery for conveying bulk material of this type from a storage bin to a scale hopper.

Conveying systems for effecting this purpose presently in use employ a main conveying conduit which extend in the form of a closed loop from its inlet end in the storage bin, pass the scale hopper and in close proximity thereto and returning to the storage bin at its discharge end, a diverter valve being so located in the main conveying conduit as to divert the material being conveyed into the scale hopper. When a pre-determined amount of material has been delivered into the scale hopper the diverter valve is shifted into a straight-through position and the main conveying conduit is cleared of material by blowing the material still remaining in the conduit through the return leg and once again into the storage bin.

A system of this type has at least two rather inherent disadvantages. Firstly, to provide the main conveying conduit in the form of a closed loop involves considerable expense inasmuch as a conduit of at least twice the length of the distance from the storage bin to the scale hopper must be employed. This is not only adds to the cost of the machinery involved but adds to the cost of installation of equipment of this type. Secondly, when a system of this type is employed for delivering material of different types from a plurality of storage bins to one or a plurality of scale hoppers, the operator, to insure that the different type materials will not become inter-mixed, must wait until after the main conveying conduit has been cleared before conveying material from a different hopper into the scale hopper. In other words, when a pre-determined amount of one type of material has been delivered to the scale hopper, the feed of material from the storage bin holding such material into the main conduit is stopped, however, the main conduit must be blown clear of all material before a different type material from a different storage bin can be fed into the conduit.

The principle of applicant's conveying system overcomes these inherent disadvantages and more specifically the main conveying conduit in applicant's system extends from the storage bin to the scale hopper and this single section of conduit is used not only to deliver the material to the scale hopper but also to return this material back into the storage bin. It will be appreciated, therefore, that applicant utilizes only one-half the length of conduit previously required. Also, when applicant's system is utilized for delivering a plurality of different types of materials from a plurality of different storage bins, there is no time lapse for clearing the conduit so as to insure no intermixing of the various type materials. For this reason, the present construction is not only less costly to manufacture, and install, but more efficient and capable of handling more material in any given time period.

It is, therefore, a primary object of the present invention to generally improve the operation and construction of conveying systems of this type.

A further object of the present invention is to provide a system wherein the main conveying conduit is utilized not only for delivering material from the storage bin to the scale hopper, but for also returning the material to the storage bin.

A still further object of the present invention is to provide a conveying system which is particularly suitable for use in conveying flour and bulk type materials in a bakery.

A further object of the present invention is to provide a conveying system wherein a plurality of different type materials can be delivered from a plurality of sources to any given destination without being intermixed.

A still further object of the present invention is to provide a diverter valve which is relatively simple in design and inexpensive in construction while being highly efficient in operation.

Other objects and advantages of the present invention will be readily apparent to those skilled in the art upon perusal of the following description and drawings, wherein:

Fig. 1 is a diagrammatic illustration of an elementary form of the invention.

Fig. 2 is a diagrammatic illustration of a more elaborate embodiment of the invention.

Fig. 3 is a plane view of a diverter valve embodying the principles of the present invention.

Fig. 4 is a left end view of the valve shown in Fig. 3.

Fig. 5 is a view taken on the line 5—5 of Fig. 3.

Fig. 6 is a view taken on the line 6—6 of Fig. 4.

Fig. 7 is a fragmentary cross-sectional view taken on the line 7—7 of Fig. 5, slightly enlarged.

In general, the principles of the present invention in its broadest aspects are achieved by positioning a weighing scale in a scale hopper which in most instances is positioned over or in close proximity to a mixer and employing a main conveying conduit which extends from a main storage bin to the scale hopper. A diverter valve, which construction will be described more fully hereinafter, is interconnected in the main conveying conduit adjacent the scale hopper and a source of air is directed into the inlet end of the conduit for pneumatically conveying material through the conduit through the diverter valve to the scale hopper when the diverter valve is in its straight-through position. When a pre-determined amount of material has been delivered to the scale hopper the diverter valve is shifted to its diverting position and directs a flow of air which is delivered into the valve through the main conveying conduit wherein it is diverted once again into the storage bin. It will be appreciated that this construction employs only one section of conduit as a main conveying conduit and that this section is employed not only for delivering material from the storage bin to the scale hopper, but also for returning the material in the conduit, after a pre-determined amount has been delivered to the scale hopper, to the storage bin.

Referring now specifically to the system illustrated in Fig. 1, a storage bin 10 is provided which can be of any suitable or well-known construction and which discharges the material stored therein, such as for example flour, by gravity through an open end into a suitable feeder valve 11 which can be of the motor-driven paddle-wheel type. The feeder valve 11 is interconnected between at one end the discharge end of an air conduit 12, and at the other end the entry end of a main conveying conduit 13. The conveying medium is supplied by a positive displacement compressor or blower 14 which can be of the Roots type or any other suitable type which supplies air under pressure, and a suitable shut-off valve 15 is interconnected in the air conduit 12 for controlling the delivery of air to the feeder 11. It will be appreciated that the valve 15 can be of any suitable or well-known construction and is shiftable from an open position wherein the air supplied by the blower is directed through the valve and into the feeder, to a closed position wherein the air is prevented from passing through the valve.

The main conveying conduit 13 extends from the feeder 11 at its entry end, as previously suggested, to within close proximity of a scale hopper 16 so as to discharge material being pneumatically carried through the conduit into the scale hopper. The scale hopper, which can be of any suitable or well-known construction, the details of construction of which form no part of the present invention, is preferably mounted over a dough mixer 17 and a suitable shut-off valve 18 is provided between the scale hopper and the dough mixer for use in discharging the contents of the scale hopper into the mixer after the pre-determined amount of material has been delivered.

Interconnected in the main conveying conduit 13 adjacent the discharge end thereof is a diverter valve 19 which is shiftable into two positions of adjustment. In one position of adjustment, indicated by the solid-line arrow 20, the diverter valve is in its straight-through position so that flour being pneumatically carried from the storage bin through the main conveying conduit 13 will pass through the diverter valve and into the scale hopper. In its other adjustment position, indicated by the broken-line arrow 21, the main conveying conduit is connected to an air line 22 which extends from the blower 14.

A second diverter valve 23, similar in construction to the first mentioned diverter valve 19, is interconnected in the main conveying conduit preferably adjacent the entry end thereof. This diverter valve is also adjustable into two positions of adjustment, in one position the diverter valve being in a straight-through position, indicated by solid-line arrow 24, so as to permit the material being pneumatically fed into the entry end of the main conveying conduit to be pneumatically directed through this diverter valve 23, and in its second position of adjustment, indicated by broken-line arrow 25, the main conveying conduit being connected to a return conduit 26 which in turn extends to the top of the storage bin 10.

The discharge end of the main conveying conduit preferably discharges tangentially into a suitable separator 27, and the air is discharged through a conduit 28 into a suitable filter 29 wherein any entrained material will be collected. The discharge end of the return conduit also discharges tangentially into a separator 30 of any suitable construction and the air discharges through a conduit 31 into a suitable filter 32 wherein any entrained material is collected.

In operation, it will be appreciated that when the shut-off valve 15 is in its open position and the diverter valves 19 and 23 are in their straight-through positions 20 and 24 respectively, the material, such as flour, which is fed into the air stream by feeder 11, is pneumatically carried through the diverter valve 23, the main conveying conduit 13, the diverter valve 19 and into the separator 27 of the scale hopper 16. After a pre-determined amount of flour has been delivered to the scale hopper, the diverter valve 19 is shifted to its diverting position 21, the diverter valve 23 is shifted to its diverting position 25, the shut-off valve 15 is closed and the feeder 11 is stopped. The main conveying conduit is then cleared of all flour pneumatically by the air stream which enters through the diverter valve 19 into the main conveying conduit 13 through the diverter valve 23 and then up through the return conduit 26 into the separator 30.

It will be appreciated that while previous systems for effecting the conveyance of bulk material such as flour have employed a closed loop which extend at one end from the feeder valve of the storage bin, pass the scale hopper and in close proximity thereto, and then returned by way of a return loop to the storage bin, the system of the present invention employs only one section of conduit which not only functions as a means for the delivery of material from the storage bin to the conduit but also functions as a means for returning the flour trapped in the conduit after the scale hopper has received a pre-determined amount of material back to the storage bin.

A more elaborated system embodying the principles of the present invention is disclosed in Fig. 2. In this system a plurality of storage bins 33, 34, 35 and 36 are provided for storing a plurality of different type materials, such as for instance, different types of flour, for delivery to a scale hopper 37. More particularly, the flour stored in storage bin 33 discharges by gravity into a feeder valve 38 and the flour is pneumatically fed into the entry end of a conveying conduit 39 by an air stream which is delivered by an air line 40. The air line 40 is connected to a blower 41 and interconnected in the air line 40 is a shut-off valve 42. The conduit 39 discharges into the scale hopper 37 through a separator 43 and a diverter valve 44, similar in construction to the previously described valve 19, is interconnected in conduit 39 adjacent the discharge end thereof. Diverter valve 44 has a straight-through position indicated by solid line arrow 45 and a diverting position indicated by broken line arrow 46. A diverter valve 47, which is similar in construction to diverter valve 23, is interconnected in the conduit 39 adjacent the entry end thereof and in one adjusted position, indicated by solid line 48, interconnects the conduit 39 in straight-through relationship, and in another position of adjustment, indicated by broken-line arrow 49, interconnects the conduit 39 with a return conduit 50, the return conduit 50 discharging into the top of the storage bin 33 through a separator 51. The diverter valve 44 when in its diverting position interconnects the conduit 39 with an air line 52 which extends from blower 41.

The storage bin 34 similarly has a feeder valve 53, a conveying conduit 54 which discharges into the scale hopper 37 through the separator 43, and a diverter valve 55 interconnected adjacent the discharge end of the conduit 54 and a diverter valve 56 interconnected adjacent the entry end of conduit 55. The conduit 55 is adjustable from its straight-through position, indicated by solid-line arrow 57, to a diverting position indicated by broken-line arrow 58, and the diverter valve 55 is adjustable from a straight-through position, indicated by solid-line arrow 59, to a diverting position indicated by broken-line arrow 60. The feeder valve 53 is connected to the blower 41 by an air line 61 and a shut-off valve 62 is interconnected to this air line. When the diverter valve 55 is in its diverting position, the conduit 54 is interconnected to the air line 52 by a feeder air line 63, and when the diverter valve 56 is in its diverting position, the conduit 54 is interconnected to a return conduit 64 which discharges into the top of the storage bin 34 through a separator 65.

The storage bin 35 similarly has a feeder valve 66 and material delivered into the air stream supplied by an air line 67 is directed into a leg 68 of conduit 39, the leg 68 being connected to the conduit 39 by a diverter valve 69. A second diverter valve 70 is interconnected in leg 68 adjacent the entry end thereof and this valve is shiftable from a straight-through position, indicated by solid-line arrow 71, to a diverting position, indicated by broken-line arrow 72, in which position leg 68 is interconnected with a return conduit 73 which empties into the top of the storage bin 35 through a separator 74. The diverter valve 69 is shiftable from a straight-through position, indicated by solid-line arrow 75, to a diverting position indicated by broken line arrow 76, in which position the leg 68 is interconnected with that portion of the conduit 39 located between the valve 69 and the valve 44. A shut-off valve 77 is interconnected in the air line 67 for regulating the air delivered to feeder 66.

The storage bin 36 similarly has a feeder valve 78 which delivers the material stored in the bin 36 into the air stream directed through an air line 79, a shut-off valve 80 being interconnected in this air line. The pneumatically conveyed material is discharged into the entry end of a leg 81 which is connected by a diverter valve 82 to the conduit 54, a second diverter valve 83 being interconnected in the leg 81 adjacent the entry end thereof. Valve 83 is shiftable from a straight-through position, indicated by solid-line arrow 84, to a diverting position, indicated by broken-line arrow 85, in which position the leg 81 is interconnected with a return conduit 86 which discharges into the top of storage bin 36 through a separator 87. The valve 82 is shiftable from a straight-through position, indicated by a solid-line arrow 88, to a diverting position, indicated by broken-line arrow 89, in which position the leg 81 is interconnected with that portion of the conduit 54 located between valve 82 and valve 55.

As in the previously described system, each of the separator 43, 51, 65, 74, and 87 has an air exhaust conduit 90 which discharges into a filter 91 wherein is collected any entrained material.

In operation, assume firstly, that it is desired to convey a predetermined amount of the flour in storage bin 33 to the scale hopper 37. In this situation the shut-off valve 42 is opened, the feeder 38 is actuated so that the flour is pneumatically directed into the entry end of the conduit 39. The diverter valve 47 is adjusted to move into its straight-through position 48, the diverter valve 69 is adjusted to move into its straight-through position 75 and the diverter valve 44 is adjusted to move into its straight-through position 45, the flour, therefore, being pneumatically conveyed through conduit 39 into scale hopper 37 through separator 43. In the above situation it will be understood of course, that shut-off valves 62, 77 and 80 are in their closed position and diverter valve 55 is in its straight-through position 57. After the predetermined amount of flour has been delivered to the scale hopper the diverter valve 44 is adjusted to its diverting position 46, the diverter valve 47 is adjusted to its diverting position 49, the feeder 38 is stopped and the valve 42 is shut. The flour, therefore, remaining in conduit 39 is returned to the bin 33 by the stream of air directed by air line 52 through valve 44, and the flour entrained in the air is directed by conduit 39 through valve 69, through valve 47, through return conduit 50 and into the storage bin 33 through the separator 51.

If the operator then desires to deliver a predetermined amount of the flour in storage bin 34 into the scale hopper 37, the shut-off valve 62 is opened and the feeder valve 53 is actuated. With diverter valves 56, 82, and 55 being in their straight-through positions, 59, 88, and 57 respectively, the flour will be pneumatically directed into the scale hopper 37 through the separator 43. It will be appreciated that it is not necessary to wait for the conduit 39 to be cleared before conveying the flour in storage bin 34 to the scale hopper 37 and that no intermixing of the respective flours in storage bins 33 and 34 can occur. After the predetermined amount of flour from storage bin 34 has been delivered to the scale hopper 37, the diverter valve 55 is adjusted to its diverting position 58, the diverter valve 56 is adjusted to its diverting position 60, the feeder valve 53 is stopped and the shut-off valve 62 is closed. The flour trapped in conduit 54 is then pneumatically directed, by the air delivered into the conduit through air line 52 and feeder 63 through diverter valve 55, into the storage bin 34 through diverter valve 88, diverter valve 56, return conduit 64 and separator 65.

If it is then desired to deliver a predetermined amount of the flour in storage bin 35 to the scale hopper 37, the shut-off valve 77 is opened and the feeder valve 66 is actuated so that flour is pneumatically carried into the leg 68, the diverter valve 70 being in its straight-through position 71, and the diverter valve 69 being in its diverting position 76. The flour is then pneumatically carried through diverter valve 69 into that portion of conduit 39 located between this valve and diverter valve 46, the diverter valve 46 being in its straight-through position 45 so that the flour is pneumatically carried into the scale hopper 37 through separator 43. When a predetermined amount of flour has been directed into scale hopper 37, the diverter valve 44 is adjusted to move into its diverting position 46, the diverter valve 70 is adjusted to move into its diverting position 72, the feeder valve 66 is stopped, and shut-off valve 77 is closed. The trapped flour is then directed back into the storage bin 35 by the air directed through air line 52 through valve 44 through valve 69 into leg 68 through valve 70 into the return conduit 73 and the separator 74.

If the operator desires to direct a predetermined amount of flour in storage bin 36 into the scale hopper 37, the shut-off valve 80 is first opened and the feeder valve 78 is actuated. The flour is then pneumatically carried through the diverter valve 83, which is in its straight-through position 84, through the leg 81 through the valve 82, which is in its diverting position 89, through that portion of the conduit 54 located between valve 82 and valve 55, through valve 55, the same being in its straight-through position 57, and into the scale hopper 37 through the separator 44. After this predetermined amount of flour has been delivered the feeder valve 78 is stopped, and the shut-off valve 80 is closed. The entrapped flour is then cleared by adjusting valve 55 and 83 into their diverting position 58 and 85 respectively so that this entrapped flour can be pneumatically directed through return conduit 86 into the storage bin 36 through the separator 87.

It will be appreciated that through the proper actuation and adjustment of the various feeder valves, shut-off valves, and diverter valves, that any predetermined weight of flour from any of the storage bins can be directed into the scale hopper and that there is no danger of intermixing any of these flours when the respective main conveying conduits are being cleared of entrapped material. It will be further appreciated that since it is not necessary to wait for the conveying conduit to be cleared before the flour in a different storage bin is delivered, that the system is considerably faster and more efficient in operation than previous systems of this type. It will also be appreciated that since a central source of air can be used, that smaller individual compressors or blowers are eliminated and that the air can be piped from the central blower to wherever it is needed. For this reason, additional conveying lines are not needed and the installation as a result is simpler and less expensive.

It will also be appreciated that the various shut-off valves and diverter valves can be electrically or hydraulically actuated and that the entire system can be operated automatically through an automatic electric controlled system so that the operator can have full control over the entire system from a central control panel. An electric control system of this type is not new and forms no part of the present invention and is therefore not disclosed. It will also be appreciated that various means may be employed which direct the flour or other bulk material into the various storage bins, however, the details of these various conveying means form no part of the present invention and are therefore not disclosed. It will be appreciated, however, that any well-known means of this type is suitable for filling the various storage bins with their respective type flours or other materials.

The diverter valve used in the present system can be of any suitable or well-known construction and a preferred form of construction for such valve is disclosed in Figs. 3, 4 and 5. As shown the valve comprises a stationary housing 92 which is U-shaped in cross section and consists of a pair of spaced side members 93 and 94 and an interconnecting member 95, each of these members being formed of rigid sheet metal. The side member 94 has formed therein a pair of openings 96 and 97 and a pipe section 98 is inserted in an opening 96 and is fixed therein by welding 99 and pipe section 100 is inserted in opening 97 and fixed therein as by welding 101. The side member 93 has an opening 103 formed therein, and a pipe section 104 is inserted so as to extend through said opening and is fixed in such position by welding 105.

A slide plate 106 is slidably carried adjacent the inner surface of the side member 94 so as to move an opening 107 into aligned position with respect to pipe section 98 and 100 as will be more fully appreciated hereinafter. More specifically, the slide plate has formed therein a pair of guide slots 108 which are located on opposite sides of opening 107 and in parallelism. The side member 94 carries four bolts 109 and these bolts are so located that two of them extend through each of the slots 108. A coiled spring 110 is placed in compression between the bolt head of each of the bolts and the side member 94 and the threaded end of each of the bolts receives a nut 111 so that the slide plate is spring loaded against the inner surface of the side member 94. It will be appreciated, therefore, that the force of the springs urge the slide plate into close proximity with respect to the surface of the side member 94 while still permitting the slide plate to be moved within the limits defined by the slots 108 relative to the side member 94.

A pipe section 112 is inserted in opening 107 and is fixed therein as by welding 113, and a section of flexible tubing 113a formed of any suitable material such as Tygon, interconnects the pipe section 112 with the pipe section 104 and is fixed to these respective pipe sections by suitable hose clamps 114 and 115. It will be appreciated, therefore, that the slide plate 106 can be shifted from the position shown in Fig. 3 wherein the pipe section 112 is in alignment with the pipe section 98 to a position wherein the pipe section 112 is moved into alignment with the pipe section 100. Assuming that one of these positions is the straight-through position and the other position is the diverting position, it will be appreciated, that the valve can be adjusted to either one of these positions by moving the slide plate within the limits defined by slots 108 relative to the side member 94.

To insure that no material will be lost between the side member 94 and the slide plate 96, a circular groove 116 is formed in the inner surface of the side member 94 which encircles the respective openings 96 and 97. An O-ring 116a is received in each of these grooves and the force of the springs 110, which as previously suggested, urges the slide plate against the inner surface of the side member 94, is sufficient to prevent any loss of material from either pipe section 94 or pipe section 100.

The slide plate can be actuated by any suitable force transmitting means and such means is illustrated in the present instance as being in the form of a double-acting air cylinder 117, which is anchored at one end to a suitable bracket 118. The piston arm 119 of the air cylinder is connected by a nut 120 to a bracket arm 121, the bracket arm 121 in turn being fixed by bolts 122 between spaced legs of a pair of angle-shaped supports 123. The angle-shaped supports are secured to the slide plates 126 by suitable screws 124. The air cylinder is so chosen that when it is in its maximum extended position the slide plate will be in the position shown in Fig. 3, wherein the valve is located in its straight-through position with pipe section 98 being interconnected with pipe section 104. When the air cylinder is in its maximum contracted position the slide plate is moved so as to move the valve into its diverting position with the pipe section 100 being interconnected with the pipe section 104.

This valve construction positively insures that no flour will be entrapped in the valve after the valve is moved from its straight-through position to its diverting position inasmuch as the flexible tubing 113a is blown clear before being shifted. For this reason, utilization of a valve of this type in a flour conveying system insures that flours of different types will not be intermixed.

What is claimed is:
1. In a system for handling bulk products, the combination of a storage container, a receptacle at a remote destination for receiving the conveyed material, a main conveying conduit extending from said container to said receptacle and discharging therein, means for pneumatically conveying material from said container into said receptacle, means after a pre-determined amount of material has been conveyed to said receptacle of reversing the air flow in said conduit for clearing the trapped material therein, and means for directing said reversed air flow into said container at a point remote from the discharge end thereof.

2. In a pneumatic conveying system for bulk materials, a storage container, a receptacle at a point remote from said storage container, a conduit interconnecting said container with said receptacle, means for selectively directing a stream of air into said conduit adjacent the opopsite ends thereof and selectively adjustable diverting means in said conduit adjacent the opposite ends thereof for pneumatically directing entrained materials from said container to said receptacle or from said receptacle to said container at a point remote from the discharge end thereof.

3. A pneumatic conveying system for delivering bulk material from a container to a remote destination comprising a container from which material may be withdrawn, a receptacle at the remote destination for receiving the conveyed material, a conduit interconnecting said container with said receptacle, means for pneumatically conveying material from said container through said conduit into said receptacle, diverting means in said conduit adjacent the discharge end thereof for pneumatically diverting the direction of travel of the material being conveyed therethrough so that said material is directed toward said container, an air supply directed to said diverting means, said diverting means being selectively adjustable to interconnect said container with said receptacle in one position of adjustment and said air supply with said conduit in another position of adjustment and diverting means in said conduit adjacent the entry end thereof for diverting the returned material into the container for storage.

4. The invention defined in claim 3 further characterized by the first mentioned diverting means including a valve shiftable from a straight-through position to a diverting position.

5. The invention defined in claim 3 further characterized by the second mentioned diverting means including a valve shiftable from a straight-through position to a diverting position.

6. The invention defined in claim 4 further characterized by a central source of air connected with said container and with said valve.

7. A pneumatic conveying system for directing bulk material to a point of destination comprising a container from which the material may be drawn, a receptacle at the remote destination for receiving the conveyed material, a main conveying conduit extending from its inlet end at the container to the receptacle at its discharge end, a diverter valve interconnected in said conduit adjacent the discharge end thereof, means for directing an air supply to said diverter valve, said diverter valve being effective when in its straight-through position to direct the material being conveyed through said conduit into said receptacle and being effective when in its diverting position to direct air into said conduit toward the entry end thereof, a second diverter valve interconnected in said conduit adjacent the entry end thereof, a return conduit extending from said diverter valve to said container, said second diverter valve being effective when in its straight-through position to direct material in said container through said conduit toward the first mentioned diverter valve and when in its diverting position to direct the air and entrained material therein being directed toward the entry end of said conduit into said return conduit and back again into said receptacle, and means for pneumatically feeding the material in said container pneumatically into the entry end of said main conduit.

8. The invention defined in claim 7 further characterized by a single source of air being employed for directing air to said first mentioned valve and for pneumatically feeding material into the entry end of said conduit.

9. In a system for handling bulk products, the combination of a plurality of material storage units, a receptacle at a remote destination for receiving the conveyed material from any of the plurality of storage units, a main conveying conduit extending from each of said storage units to said receptacle and discharging into said receptacle, means in said conduit for selectively connecting said receptacle with any of said storage units, means for pneumatically feeding material in any of said storage units through said conduit to said receptacle, means for reversing the direction of air flow so as to return the material trapped in said conduit after a pre-determined amount of material has been delivered to said receptacle, and means associated with each of said storage units for diverting the returned air flow into the proper storage unit.

10. In a system for handling bulk products, the combination of a plurality of material storage units, a receptacle at a remote destination for receiving the conveyed material from any of the plurality of storage units, a main conveying conduit extending from each of said storage units to said receptacle and discharging into said receptacle, means in said conduit adjacent the discharge end thereof for diverting a stream of air into said conduit for clearing said conduit, second diverting means interconnected in said conduit for selectively directing material from any of the storage units through said conduit to said receptacle, and means located adjacent each of said storage units for diverting the return air flow and material entrained therein into each of its associated storage units.

11. A pneumatic conveying system for delivering bulk material from a plurality of containers to a remote destination comprising a plurality of containers from which material may be drawn, a receptacle at the remote destination for receiving the conveyed material, selective means in said conduit for selectively interconnecting said conduit with any one of said containers, means for pneumatically conveying material from any one of said containers through said conduit into said receptacle, diverting means in said conduit adjacent the discharge end thereof for pneumatically diverting the direction of travel of the material being conveyed therethrough so that said material is directed toward the containers from which it was drawn, and diverting means in said conduit adjacent the entry end thereof with each of said containers for diverting returned material into the container from which it was withdrawn.

12. A pneumatic conveying system for directing bulk material to a point of destination comprising a container from which the material may be drawn, a receptacle at the remote destination for receiving the conveyed material, a conduit interconnecting said container with said receptacle, diverting means in said conduit adjacent to the discharge end thereof, diverting means in said conduit adjacent the entry end thereof, means for directing an air supply to each of said diverting means, the first mentioned diverting means selectively controlling the movement therethrough of entrained material to said receptacle or the flow of air into said conduit toward said container, the second mentioned diverting means selectively controlling the movement of entrained material from said container to said receptacle or the movement of entrained material from said second diverting means to said container.

References Cited in the file of this patent

UNITED STATES PATENTS

| | | |
|---|---|---|
| 1,538,027 | Cushing | May 19, 1925 |
| 2,234,788 | Williams | Mar. 11, 1941 |
| 2,586,144 | Benoit | Feb. 19, 1952 |
| 2,688,517 | Riordan | Sept. 7, 1954 |
| 2,688,518 | Krenke | Sept. 7, 1954 |
| 2,795,463 | Weller | June 11, 1957 |
| 2,810,609 | Temple | Oct. 22, 1957 |